(12) United States Patent
Tamura (10) Patent No.: US 7,370,113 B2
(45) Date of Patent: May 6, 2008

(54) WIRELESS LAN APPARATUS (75) Inventor: Yosuke Tamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 928 days.

(21) Appl. No.: 10/692,933

(22) Filed: Oct. 27, 2003

(65) Prior Publication Data
US 2005/0050217 A1    Mar. 3, 2005

(30) Foreign Application Priority Data
Aug. 26, 2003 (JP) ............... 2003-208810

(51) Int. Cl.
G06F 15/16 (2006.01)
(52) U.S. Cl. .............. 709/230; 340/825; 370/465; 370/466; 370/467; 370/468; 370/469
(58) Field of Classification Search ........ 709/230–237; 370/465; 710/105; 340/825
See application file for complete search history.

(56) References Cited

U.S. PATENT DOCUMENTS 6,101,188 A * 8/2000 Sekine et al. ............... 370/401

2003/0100309 A1 * 5/2003 Hull ......................... 455/450

OTHER PUBLICATIONS

"Process Defragment", International Standard ISO/IEC 8802-11:1999 (E), Part II: Wirless LAN Medium Access Control (MAC) and Physical Layer (PHY) specifications, The Institute of Electrical and Electronics Engineers, Inc., 1999, pp. 396-399.

* cited by examiner

Primary Examiner—Ario Etienne
Assistant Examiner—Michael C Lai
(74) Attorney, Agent, or Firm—Oblon, Spivak, McClelland, Maier & Neustadt, P.C.

(57) ABSTRACT

A wireless LAN apparatus includes a reception section which receives frames including fragments respectively, a reading section which reads a total number of fragments based on the first data, a queue that stores the received frames for each fragment, a free-area detecting section which detects free areas in the queue, a determining section which determines whether the amount of the first data based on the total number of fragments in the first data is larger than the amount of free areas in the queue or is equal to or smaller than the amount of free areas in the queue, and a control section having a function of inserting fragments based on the first data into the queue if the determining section determines that the amount of the first data is equal to or smaller than the amount of free areas in the queue.

15 Claims, 7 Drawing Sheets

WIRELESS LAN APPARATUS

CROSS-REFERENCE TO RELATED APPLICATIONS

This application is based upon and claims the benefit of priority from the prior Japanese Patent Application No. 2003-208810, filed Aug. 26, 2003, the entire contents of which are incorporated herein by reference.

BACKGROUND OF THE INVENTION

1. Field of the Invention

The present invention relates to a wireless LAN (Local Area Network) apparatus for use in a wireless LAN system.

2. Description of the Related Art

It has been possible to construct a wireless LAN system in a limited area so that data can be transmitted between a plurality of apparatuses via a wireless medium.

A system in an infrastructure mode which is essential according to the IEEE (Institute of Electrical and Electronics Engineers) 802.11 standard is composed of a wireless LAN access point (hereinafter referred to as an "AP") and a plurality of wireless LAN apparatuses (stations: hereinafter referred to as "STAs") residing within the radio wave range of the wireless LAN access point.

The STA handles data for each MAC service data unit (MSDU) or MAC management protocol data unit (MMPDU), which is a predetermined data unit. If the STA transmits a MAC service data unit (MSDU) or a MAC management protocol data unit (MMPDU) to a receiving apparatus, the transmission is carried out by fragmenting this data unit into MAC protocol data units (MPDU) that are MAC level frames each having a shorter data structure than the MSDU or MMPDU. This fragmentation is effective in improving the reliability of data transmission if channel characteristics are such that the transmission of long frames degrades the reliability of data transmission.

On receiving the fragments generated by the fragmentation, the STA inserts them into a queue. The queue temporarily stores data, process requests, and the like. Then, the plurality of fragments are reconstructed (defragmented) into the MSDU or MMPDU.

The STA supports the simultaneous reception of at least three data units (MSDUs or MMPDUs). Further, the STA comprises at least three reception counters for the respective data units being received. If the STA receives fragments constituting a data unit not managed by any reception counters, it discards all the fragments.

Each data unit is managed on the basis of a max receive lifetime indicative of the maximum allowable time required to receive one data unit. The reception counter starts counting on receiving the first fragment of the data unit. Then, if a reception timer exceeds the max receive time, the STA discards all the fragments of this data unit. If fragments succeeding this data unit are received after the max receive lifetime has been exceeded, the STA transmits an acknowledge (ACK) signal to the source apparatus to discard these succeeding fragments.

However, if a new data unit is received when the queue contains only a small amount of free areas, the free areas in the queue may be used up before all the fragments of this data unit are received. This may result in an overflow error.

On the other hand, the receiving STA uniformly discards the fragments of data units that have exceeded the max receive lifetime. Consequently, even the fragments of data units that have been almost completely defragmented may be discarded.

BRIEF SUMMARY OF THE INVENTION

According to a first aspect of the present invention, there is provided a wireless LAN apparatus comprising a reception section which receives frames including fragments respectively, each of the fragments having a predetermined size into which first data is divided; a reading section which reads the total number of fragments based on the first data, the total number of fragments being containing the first frame based on the first data, the first frame being first received by the reception section; a queue that stores the received frames for each fragment; a free-area detecting section which detects free areas in the queue; a determining section which determines whether the amount of the first data based on the total number of fragments in the first data is larger than the amount of free areas in the queue or is equal to or smaller than the amount of free areas in the queue; and a control section having a function of inserting fragments based on the first data into the queue if the determining section determines that the amount of the first data is equal to or smaller than the amount of free areas in the queue.

According to a second aspect of the present invention, there is provided a wireless LAN apparatus comprising a reception section which receives frames including fragments respectively, each of the fragments having a predetermined size into which first data is divided; a reading section which reads the total number of fragments based on the first data, the total number of fragments being containing the first frame based on the first data, the first frame being first received by the reception section; a determining section which determines whether the percentage of the total number of fragments in the first data taken up by the number of already received fragments based on the first data to is equal to or larger than a predetermined value or is smaller than the predetermined value; a control section which sets a max receive lifetime indicative of an allowable range of time required to receive fragments based on one data by increasing the max receive lifetime by a predetermined extension time if the determining section determines that the percentage is larger than the predetermined value; and an aging processing section which executes a process of discarding data for which all fragments have not been received when the max receive lifetime has elapsed.

DETAILED DESCRIPTION OF THE INVENTION

Embodiments of the present invention will be described below with reference to the drawings.

A system configuration in an infrastructure mode which is essential according to the IEEE (Institute of Electrical and Electronics Engineers) 802.11 standard is composed of a wireless LAN access point (hereinafter referred to as an "AP") and a plurality of wireless LAN apparatuses (stations: hereinafter referred to as "STAs") residing within the radio wave range of the wireless LAN access point. This configuration will hereinafter referred to as a basic service set (hereinafter referred to as a "BSS"). In this case, the STA is an apparatus comprising a physical layer and a MAC layer and using a wireless medium as an interface. An architecture for the wireless LAN has a plurality of BSSs formed to provide a wireless LAN system that makes the mobility of the STAs transparent to higher layers. Each STA also comprises a handoff function of autonomically detecting its own movement and updating its belonging to the AP of a different BSS. Thus, even if the STA is moving, the mobility characteristic of a wireless environment is ensured without interrupting communications.

Figure 1:
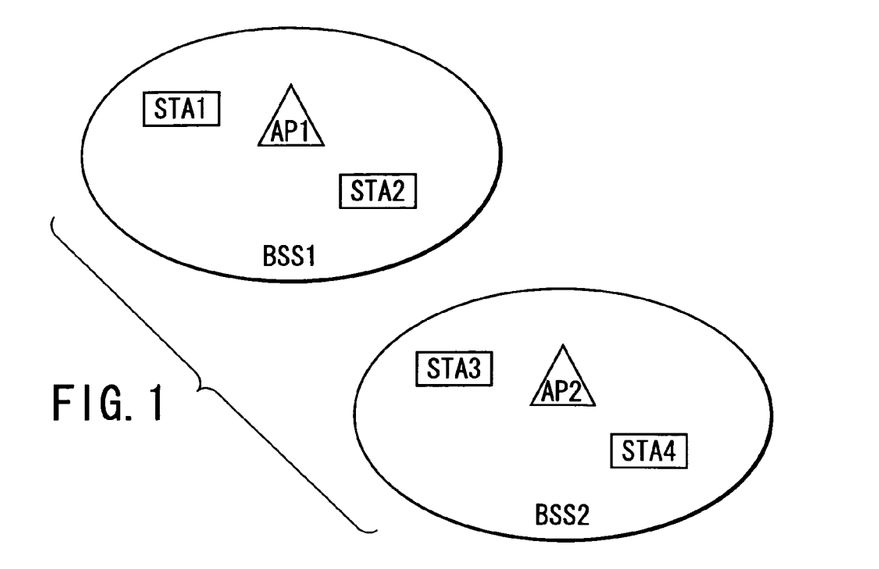
FIG. 1 is a schematic diagram showing a configuration of a wireless LAN system according to an embodiment of the present invention.

In FIG. 1, a BSS1 is composed of an AP1, a STA1 and a STA2. A BSS2 is composed of an AP2, a STA3 and a STA4. The STA1 is connected to the AP1 via a wireless channel. The AP1 and AP2 are connected together by, for example, an Ethernet and to a backbone network via this Ethernet.

First Embodiment

Figure 2:
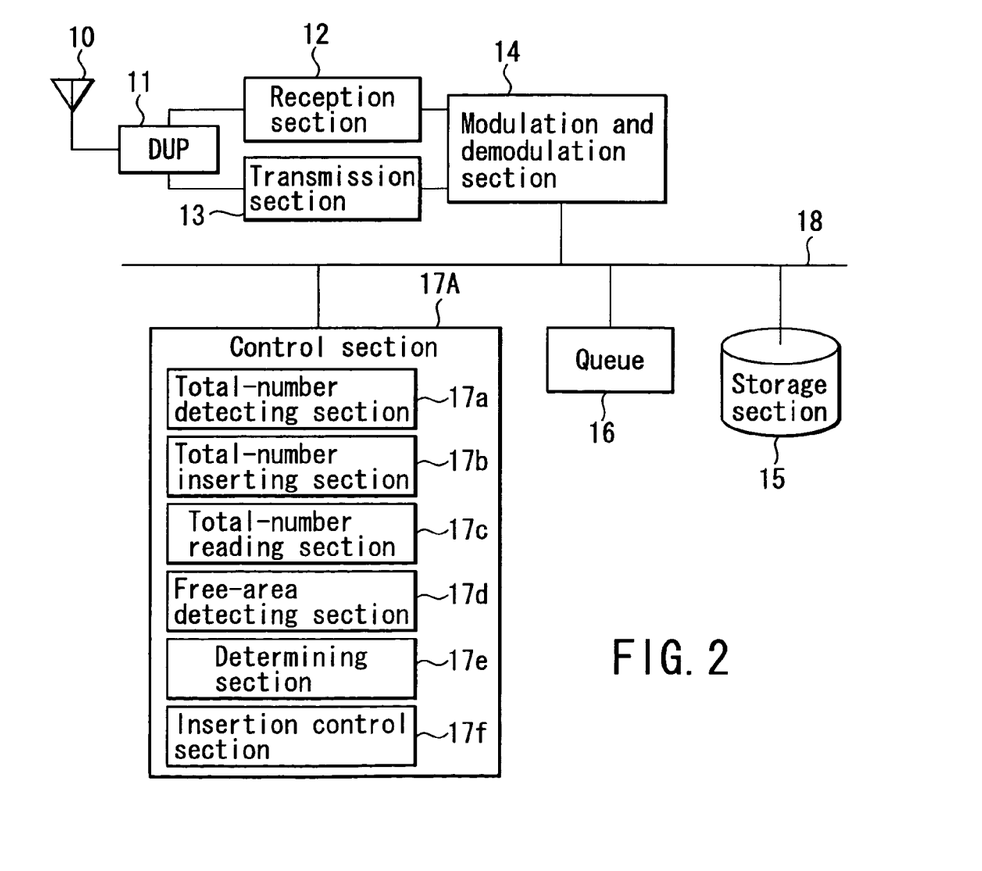
FIG. 2 is a block diagram showing a station STA1 according to a first embodiment of the present invention.

FIG. 2 is a block diagram of the STA1 according to a first embodiment of the present invention. The STA1 uses, for example, a DCF (Distributed Coordination Function) known as CSMA/CA (Carrier Sense Multiple Access/Collision Avoidance) to access a MAC layer.

Description will be given of the case in which the STA1 transmits data to the STA2. First, the STA1 senses a carrier from the STA2 to determine whether or not the STA2 is transmitting data. Furthermore, the STA1 senses whether or not any data has been transmitted to it. If it is determined that no data collisions are occurring and the carrier is not busy, then the STA1 starts a transmitting process.

With the CSMA/CA, adjacent frames are transmitted at minimum specific intervals. Before transmissions, the STA1 ensures that the carrier will be idle with the above intervals. If the STA1 determines that the carrier is busy, the STA1 enters a transmission standby state. In carrying out retransmission after the standby or after the transmission has been successful, the STA executes this process after a randomly assigned time has elapsed.

In this manner, the STA1 first confirms that the carrier is idle. Then, after the standby or after the randomly assigned time has elapsed, the STA1 exchanges an RTS (Request to Send) signal and a CTS (Clear to Send) signal with the STA2. Subsequently, the STA1 transmits frames to the STA2.

A radio signal transmitted by the AP1 is received by an antenna 10 and then inputted to a reception section via an antenna duplexer (DUP). The reception section 12 subjects the received radio signal to frequency conversion to obtain an intermediate frequency signal by multiplying the former signal by a local oscillation signal outputted by a frequency synthesizer (not shown). The intermediate frequency signal is inputted to a modulation and demodulation section 14.

The modulation and demodulation section 14 separates the intermediate frequency signal into an I signal and a Q signal that are orthogonal to each other. The I and Q signals are outputted by the modulation and demodulation section 14 as orthogonal demodulated signals. The orthogonal demodulated signals are inputted to a control section 17A via a bus 18. The control section 17A then executes a predetermined process on the signals.

On the other hand, the I and Q signals outputted by the control section 17A are inputted to the modulation and demodulation section 14 via the bus 18. The modulation and demodulation section 14 modulates the I and Q signals into an intermediate frequency signal. The intermediate frequency signal is inputted to a transmission section 13.

The transmission section 13 subjects the intermediate frequency signal to frequency conversion by multiplying this signal by the local oscillation signal outputted by the frequency synthesizer (not shown), to obtain a radio signal with a predetermined frequency. This radio signal is transmitted by the antenna 10 via the antenna duplexer 11.

A storage section 15 stores, for example, downloaded contents and various data. A queue 16 temporarily stores data, process requests, and the like. The capacity of the queue 16 is arbitrarily set in accordance with a specification or the apparatus.

The control section 17A executes control such as normal radio access control, fragmentation, and defragmentation.

Figure 3:
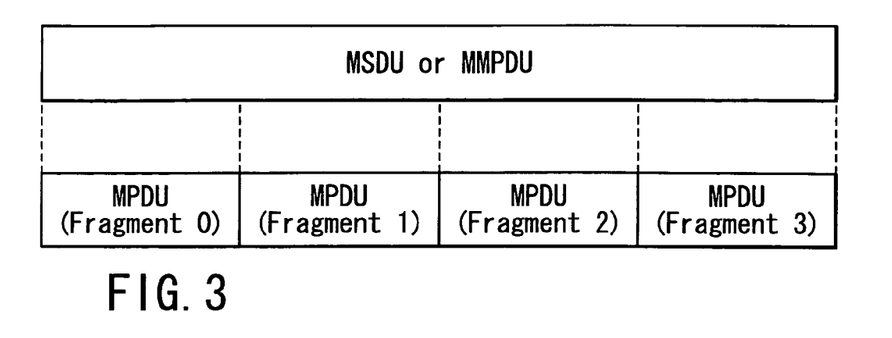
FIG. 3 is a schematic table illustrating an example in which a data unit MSDU or MMPDU is divided into four data units MPDU.

The STA1 handles, for example, MAC service data units (MSDU) and MAC management protocol data units (MMPDU). An MSDU or an MMPDU is divided into MAC protocol data units (MPDU) for a MAC layer. This division process is called "fragmentation". FIG. 3 is a schematic diagram illustrating an example in which an MSDU or MMPDU is divided into four MPDUs. The MPDUs obtained by the division are called "fragments".

The fragmentation is carried out in order to improve the success rate and reliability of transmission of MSDUs or MMPDUs (hereinafter collectively referred to as "data units") if channel characteristics are such that the transmission of long frames degrades the reliability of data transmission. Further, the fragmentation results in MPDUs each having a length smaller than a data unit length. The fragmentation is carried our immediately before the transmission of frames.

On the other hand, a process of generating one data unit from a plurality of MPDUs is called "defragmentation". The defragmentation is carried out immediately after reception.

Each fragment contains information that can be reassembled into the original data unit. A frame contains a fragment and a header. The header contains a frame type, the address of a transmitter, a destination address, a sequence control field, and a more-fragment indication. A part of the information in the header is reassembled into a data unit.

The sequence control field allows it to be checked whether or not the fragment received by the receiver belong to the same data unit as the preceding fragment and whether or not the fragment is included in a sequence to be reassembled. The sequence control field contains a sequence number and a fragment number. The same sequence number is used for all the fragments based on one data unit. The fragment number increments in the order of the fragments.

The more-fragment indication indicates to the receiver whether or not the fragment is the last one in the data unit. If the fragment is the last one, the more-fragment indication is set to 0. For all other fragments, the more-fragment indication is set to 1.

The receiving STA2 defragments the data unit in the queue 16 by combining the fragments together in the order of the fragment numbers shown in the sequence control field. The STA2 finds that the data unit is still incomplete if it has not received the fragment with the more-fragment indication set to 0. On receiving the fragment with the more-fragment indication set to 0, the STA2 finds that no more fragments are to be received for the data unit.

The control section 17A further comprises a total-number detecting section 17a, a total-number inserting section 17b, a total-number reading section 17c, a free-area detecting section 17d, a determining section 17e, and an insertion control section 17f.

The total-number detecting section 17a detects the total number of fragments generated by fragmenting a data unit.

The total-number inserting section 17b inserts the total number of fragments detected by the total-number detecting section 17a, into the header of the frame containing the first fragment in the data unit.

The total-number reading section 17c reads the total number of fragments from the received frame.

The free-area detecting section 17d detects the amount of free areas in the queue 16.

The determining section 17e determines whether or not the amount of the data unit calculated from the total number of fragments is larger than the amount of free areas in the queue 16 or is equal to or smaller than this amount. The total amount of the data unit is calculated by multiplying the amount of the MPDU by the total number of fragments.

If the determining section 17e determines that the amount of the data unit is equal to or smaller than the amount of free areas in the queue 16, the insertion control section 17f sequentially inserts the succeeding fragments based on the data unit, into the queue 16. If the determining section 17e determines that the amount of the data unit is larger than the amount of free areas in the queue 16, the insertion control section 17f discards the fragments based on the data unit.

Now, description will be given of an operation performed by the transmitting STA1 to insert the total number of fragments.

The control section 17A fragments a data unit to be transmitted and detects the total number of a plurality of resulting fragments. Then, in generating a first frame containing the first one of the plurality of resulting fragments, the control section 17A inserts the detected total number of fragments into a header contained in the first frame. The thus generated first frame is transmitted to a communicating terminal in accordance with the previously described transmission procedure. The succeeding fragments are formed into normal frames, which are then sequentially transmitted.

Figure 4:
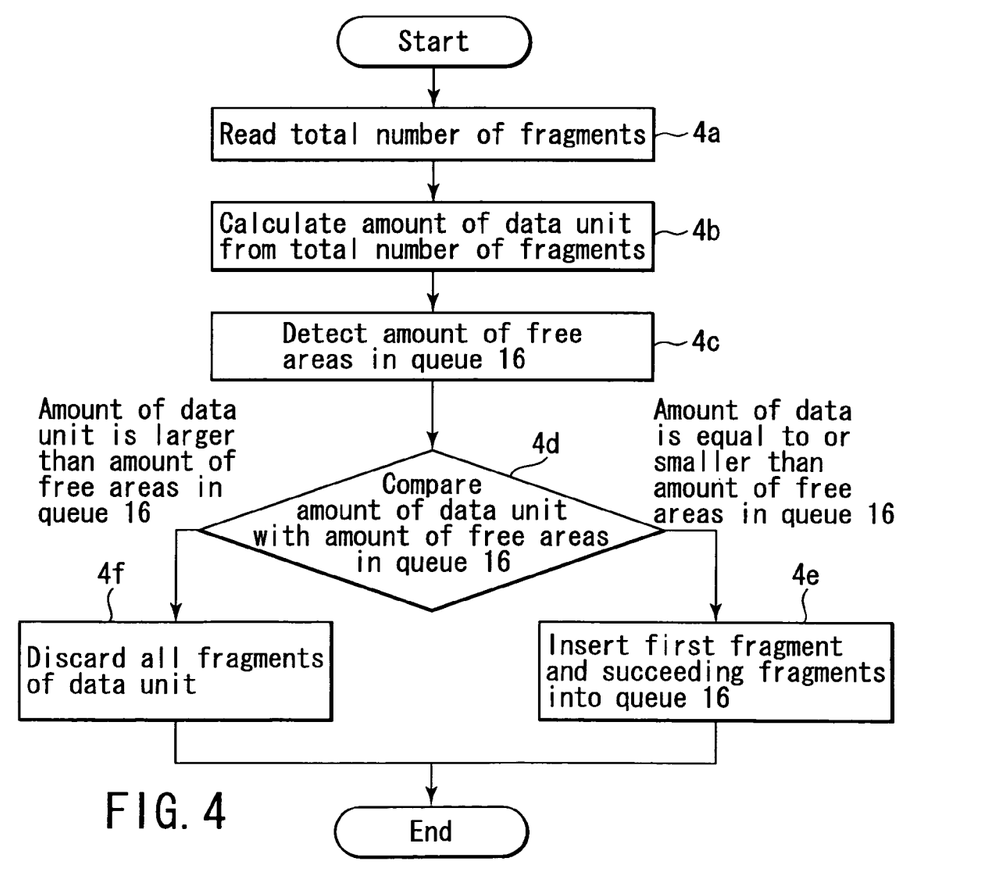
FIG. 4 is a flow chart showing fragment reception control executed in a station STA2, shown in FIG. 2.

Now, description will be given of an operation performed by the receiving STA2 to receive fragments. FIG. 4 is a flow chart showing fragment reception control.

It is assumed that the STA2 exchanges an RTS and a CTS with the communicating apparatus and receives the first frame based on the data unit.

The control section 17A reads the total number of fragments contained in the header of the received first frame (step 4a). Then, the control section 17A calculates the amount of the data unit from the total number of fragments (step 4b). This amount is calculated by multiplying the MPDU, the unit for fragments, by the total number of fragments.

Then, the control section 17A detects the amount of free areas in the queue 16 (step 4c). Then, the control section 17A compares the amount of the data unit with the amount of free areas in the queue 16 (step 4d). That is, the control section 17A determines whether or not the amount of the data unit is larger than the amount of free areas in the queue 16 or is equal to or smaller than this amount.

If it is determined in step 4d that the amount of the data unit is equal to or smaller than the amount of free areas in the queue 16, the control section 17A inserts the fragment contained in the first frame, into the queue 16. Furthermore, the control section 17A sequentially receives fragments based on the data unit and inserts them into the queue 16 (step 4e).

On the other hand, if it is determined in step 4d that the amount of the data unit is larger than the amount of free areas in the queue 16, the control section 17A discards the fragment contained in the first frame. The control section 17A further discards all the succeeding fragments based on the data unit (step 4f).

As described above in detail, in the first embodiment, when a data unit is transmitted, the total number of fragments resulting from fragmentation is detected. Then, a first frame with the first fragment is transmitted together with the total number of fragments.

If the transmitted data unit is received, the total number of fragments contained in the frame containing the first fragment is read. Then, the amount of the data unit is calculated from the total number of fragments. Then, the amount of free areas in the queue 16 is detected and compared with the amount of the data unit. If it is determined that the amount of the data unit is equal to or smaller than the amount of free areas in the queue 16, the fragments are sequentially inserted into the queue 16. On the other hand, if it is determined that the amount of the data unit is larger than the amount of free areas in the queue 16, all the fragments based on the data unit are discarded.

Thus, according to the first embodiment, before the fragments of a data unit are inserted into the queue 16, it is determined whether or not all the fragments of the data unit can be inserted into the queue 16. Thus, data units that may result in overflow errors are detected beforehand and are not inserted into the queue 16. This improves the efficiency with which the queue 16 is utilized.

Second Embodiment

A second embodiment differs from the above first embodiment in the control section 17A, determining section 17e, and insertion control section 17f. Thus, only the difference will be described, with the description of similar arrangements omitted.

The determining section 17e of the STA according to the second embodiment determines whether or not the amount of the data unit calculated from the total number of fragments is larger than the amount of free areas in the queue 16 or is equal to or smaller than this amount. Further, if the determining section 17e determines that the amount of the data unit is larger than the amount of free areas in the queue 16, then it determines whether or not the difference between the amount of the data unit and the amount of free areas in the queue 16 is larger than a predetermined amount or is equal to or smaller than this amount. This predetermined amount is such that only a small amount overflows if for example, all the fragments of the data unit are inserted into the queue 16. It can be arbitrarily set in accordance with the specification of the apparatus. Further, the total amount of the data unit is calculated by multiplying the amount of the MPDU by the total number of fragments.

If the determining section 17e determines that the amount of the data unit is equal to or smaller than the amount of free areas in the queue 16, the insertion control section 17f sequentially inserts the succeeding fragments based on the data unit, into the queue 16.

On the other hand, if the determining section 17e determines that the amount of the data unit is larger than the amount of free areas in the queue 16 and the difference between the amount of the data unit and the amount of free areas in the queue 16 is equal to or smaller than the predetermined amount, then the insertion control section 17f discards an amount of data units equal to those fragments based on the data unit which can all be inserted into the queue 16, from a plurality of data units some fragments of which have already been inserted into the queue 16, in the order of increasing percentage of the total number of fragments taken up by the number of fragments already inserted into the queue 16. Furthermore, the insertion control section 17f inserts, into the queue 16, the fragment contained in the first frame and the succeeding fragments based on the data unit.

Further, if the determining section 17e determines that the amount of the data unit is larger than the amount of free areas in the queue 16 and the difference between the amount of the data unit and the amount of free areas in the queue 16 is larger than the predetermined amount, then the insertion control section 17f discards all the fragments based on the data unit.

Figure 5:
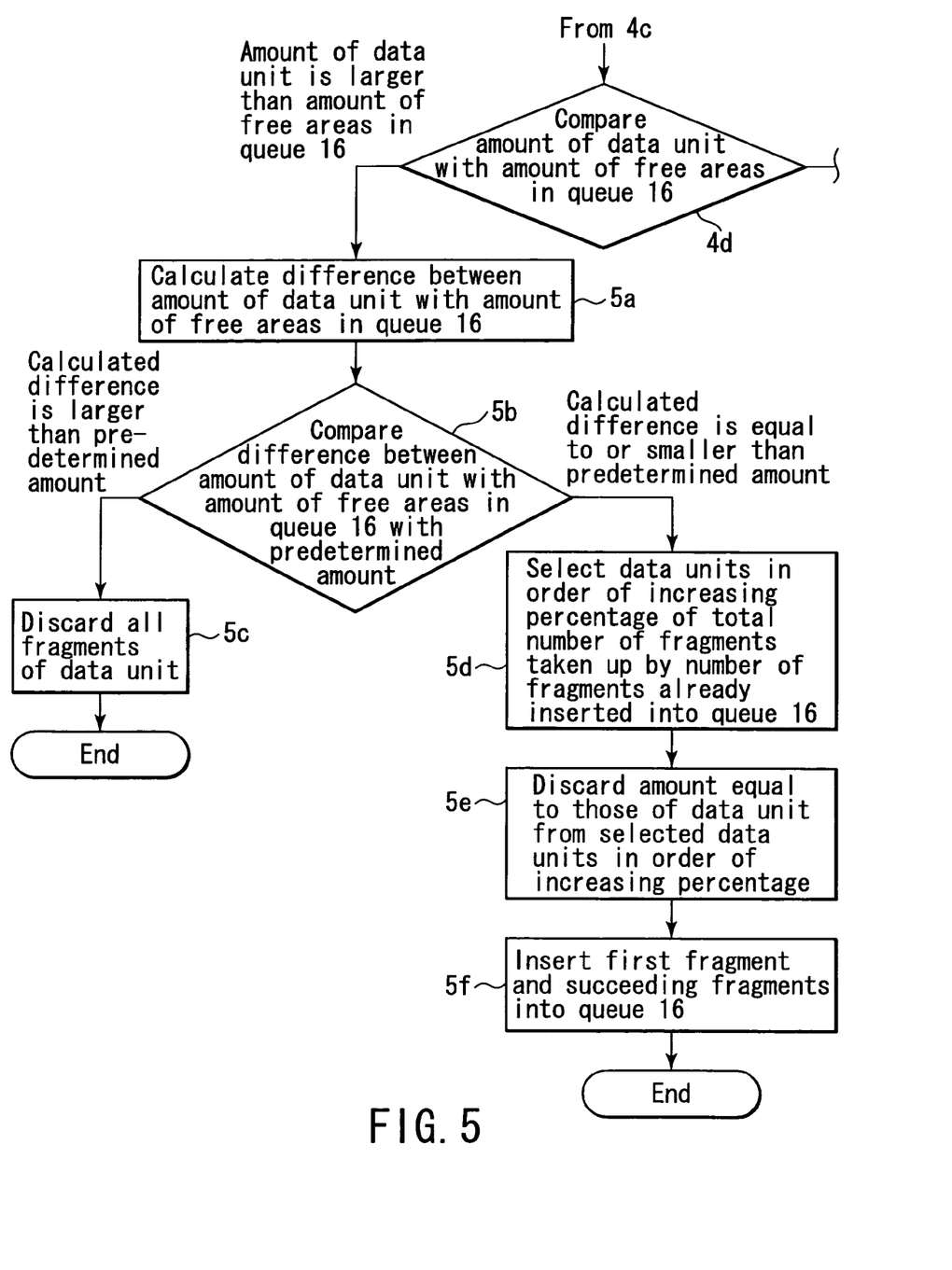
FIG. 5 is a flow chart showing fragment reception control executed in the station STA2 according to a second embodiment of the present invention.

Now, description will be given of an operation performed by the receiving STA2 to receive fragments. FIG. 5 is a flow chart showing fragment reception control.

Steps 4a to 4b in FIG. 4 are similar to those in the above first embodiment. Accordingly, their illustration and description are omitted.

If the control section 17A determines in step 4d that the amount of the data unit is larger than the amount of free queues in the queue 16, it calculates the difference between the amount of the data unit and the amount of free queues in the queue 16 (step 5a). Then, the control section 17A compares the amount of the data unit with the amount of free areas in the queue 16 (step 5b). If the control section 17A determines in step 5b that the difference between the amount of the data unit and the amount of free areas in the queue 16 is larger than the predetermined amount, it discards the fragments contained in the first frame. The control section 17A further discards all the succeeding fragments based on the data unit (step 5c).

On the other hand, if the control section 17A determines in step 5b that the difference between the amount of the data unit and the amount of free areas in the queue 16 is equal to or smaller than the predetermined amount, then it sequentially selects data units some fragments of which have already been inserted into the queue 16, in the order of increasing percentage of the total number of fragments taken up by the number of fragments already inserted into the queue 16 (step 5d). Then, the control section 17A discards an amount corresponding to the calculated difference, from the selected data units in the order of increasing rate (step 5e). Then, the control section 17A inserts the fragments contained in the first frame into the queue 16. Furthermore, the control section 17A receives and inserts the succeeding fragments into the queue 16 (step 5f).

As described above in detail, in the second embodiment, if it is determined that the amount of a received data unit is larger than the amount of free areas in the queue 16, the difference between the amount of the data unit and the amount of free areas in the queue 16 is compared with the predetermined amount. If it is determined that the difference between the amount of the data unit and the amount of free areas in the queue 16 is larger than the predetermined amount, all the fragments of the data unit are discarded.

On the other hand, if it is determined that the difference between the amount of the data unit and the amount of free areas in the queue 16 is equal to or smaller than the predetermined amount, an amount of data units corresponding to the received data unit are discarded from a plurality of data units some fragments of which have already been inserted into the queue 16, in the order of increasing percentage of the total number of fragments taken up by the number of fragments already inserted into the queue 16. Then, the fragments of the received data unit are sequentially inserted into the queue 16.

Thus, according to the second embodiment, if the amount of the data unit is compared with the amount of free areas in the queue 16 and is determined to be, for example, slightly larger than it, the utilization efficiency of the queue can be improved by adjusting the amount of free areas in the queue 16 before inserting the fragments of the data unit into the queue 16.

Further, data units to be discarded are sequentially selected in the order of increasing percentage of the total number of fragments taken up by the number of fragments already inserted into the queue 16. Accordingly, it is possible to discard data units that have been insufficiently defragmented.

Further, an amount of received data unit which can be inserted into the queue 16 is discarded. This further improves the utilization efficiency of the queue 16.

Third Embodiment

A third embodiment differs from the above second embodiment in the insertion control section 17f. Thus, only the difference will be described, with the description of similar arrangements omitted.

If the determining section 17e determines that the amount of the data unit is equal to or smaller than the amount of free areas in the queue 16, the insertion control section 17f sequentially inserts the succeeding fragments based on the data unit, into the queue 16.

On the other hand, if the determining section 17e determines that the amount of the data unit is larger than the amount of free areas in the queue 16 and the difference between the amount of the data unit and the amount of free areas in the queue 16 is equal to or smaller than the predetermined amount, then the insertion control section 17f discards a predetermined amount of data units from a plurality of data units some fragments of which have already been inserted into the queue 16, in the order of the time at which the first frame is received. Furthermore, the insertion control section 17e sequentially inserts, into the queue 16, the fragments contained in the first frame and the succeeding fragments based on the data unit.

On the other hand, if the determining section 17e determines that the amount of the data unit is larger than the amount of free areas in the queue 16 and the difference between the amount of the data unit and the amount of free areas in the queue 16 is larger than the predetermined amount, then the insertion control section 17f discards all the fragments based on the data unit.

Figure 6:
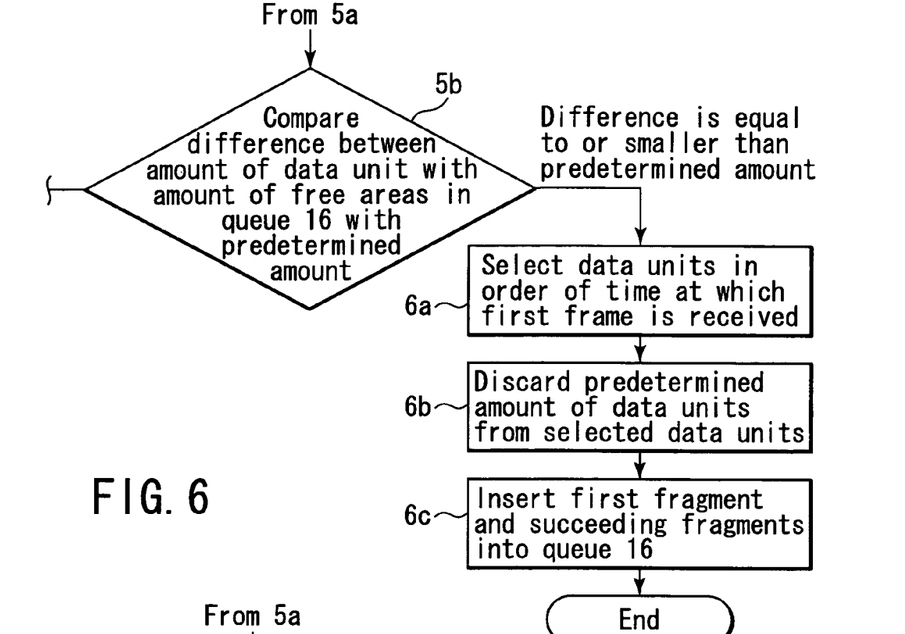
FIG. 6 is a flow chart showing fragment reception control executed in the station STA2 according to a third embodiment of the present invention.

Now, description will be given of an operation performed by the receiving STA2 to receive fragments. FIG. 6 is a flow chart showing fragment reception control.

Steps 4a to 4e and 5a to 5c in FIG. 6 are similar to those in the above second embodiment. Accordingly, their illustration and description are omitted.

If the control section 17A determines in step 5b that the difference between the amount of the data unit and the amount of free areas in the queue 16 is equal to or smaller than the predetermined amount, then it sequentially selects data units some fragments of which have already been inserted into the queue 16, in the order of the time at which the first frame is received (step 6a). Then, the control section 17A discards the predetermined amount in the selected data units in the order of the time at which the first frame is received (step 6b). Then, the control section 17A inserts the fragments contained in the first frame into the queue 16. Furthermore, the control section 17A receives and inserts the succeeding fragments into the queue 16 (step 6c).

As described above in detail, in the third embodiment, if it is determined that the amount of a received data unit is larger than the amount of free areas in the queue 16, the difference between the amount of the data unit and the amount of free areas in the queue 16 is compared with the predetermined amount. If it is determined that the difference between the amount of the data unit and the amount of free areas in the queue 16 is larger than the predetermined amount, all the fragments of the data unit are discarded.

On the other hand, if it is determined that the difference between the amount of the data unit and the amount of free areas in the queue 16 is equal to or smaller than the predetermined amount, the predetermined amount of data units are discarded from a plurality of data units some fragments of which have already been inserted into the queue 16, in the order of the time at which the first frame is received. Then, the fragments of the received data unit are sequentially inserted into the queue 16.

Thus, according to the third embodiment, if the amount of the data unit is compared with the amount of free areas in the queue 16 and is determined to be, for example, slightly larger than it, the utilization efficiency of the queue can be improved by adjusting the amount of free areas in the queue 16 before inserting the fragments of the data unit into the queue 16.

Further, data units to be discarded are sequentially selected in the order of the time at which the first frame is received. Accordingly, it is possible to discard data units that require a long time for defragmentation.

Further, the predetermined amount are always discarded. This reduces burdens on the control section 17A.

In the third embodiment, when the amount of free areas in the queue 16 is adjusted, the predetermined amount are discarded. The amount of data units discarded may be equal to the amount of the received data unit as described in the second embodiment.

Further, in the second embodiment, when the amount of free areas in the queue 16 is adjusted, an amount of data units equal to the amount of the received data unit are discarded. However, the amount of data units discarded may have the predetermined amount as described in the third embodiment.

Fourth Embodiment

A fourth embodiment differs from the above third embodiment in the insertion control section 17f. Thus, only the difference will be described, with the description of similar arrangements omitted.

If the determining section 17e determines that the amount of the data unit is equal to or smaller than the amount of free areas in the queue 16, the insertion control section 17f sequentially inserts the succeeding fragments based on the data unit, into the queue 16.

On the other hand, if the determining section 17e determines that the amount of the data unit is larger than the amount of free areas in the queue 16 and the difference between the amount of the data unit and the amount of free areas in the queue 16 is equal to or smaller than the predetermined amount, then the insertion control section 17f discards an amount of data units equal to those fragments based on the data unit which can all be inserted into the queue 16, from a plurality of data units some fragments of which have already been inserted into the queue 16, in which a percentage of the total number of fragments taken up by the number of fragments already inserted into the queue 16 is smaller than the predetermined percentage, in the order of the time at which the first frame is received. Furthermore, the insertion control section 17f inserts, into the queue 16, the fragment contained in the first frame and the succeeding fragments based on the data unit. The predetermined percentage is, for example, the percentage of the total number of fragments taken up by the number of those which have almost been reconstructed. The predetermined percentage can be arbitrarily set in accordance with the specification of the apparatus.

Further, if the determining section 17e determines that the amount of the data unit is larger than the amount of free areas in the queue 16 and the difference between the amount of the data unit and the amount of free areas in the queue 16 is larger than the predetermined amount, then the insertion control section 17f discards all the fragments based on the data unit.

Figure 7:
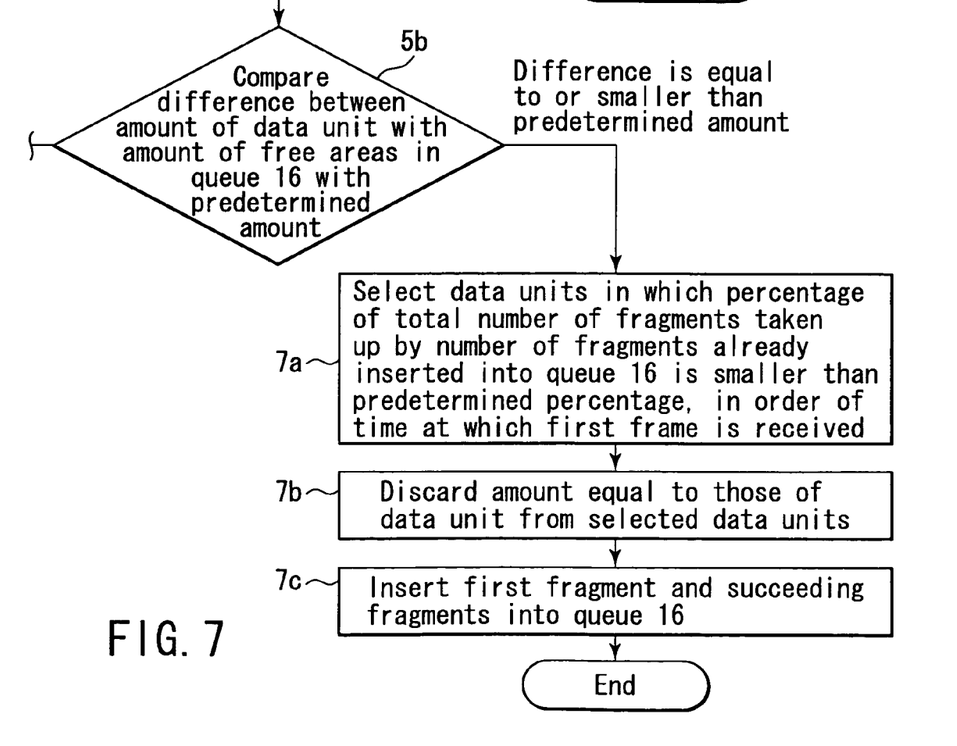
FIG. 7 is a flow chart showing fragment reception control executed in the station STA2 according to a fourth embodiment of the present invention.

Steps 4a to 4e and 5a to 5c in FIG. 7 are similar to those in the above second embodiment. Accordingly, their illustration and description are omitted.

If the control section 17A determines in step 5b that the difference between the amount of the data unit and the amount of free areas in the queue 16 is equal to or smaller than the predetermined amount, then it sequentially selects data units some fragments of which have already been inserted into the queue 16, in which a percentage of the total number of fragments taken up by the number of fragments already inserted into the queue 16 is smaller than the predetermined percentage, in the order of the time at which the first frame is received (step 7a). Then, the control section 17A discards an amount of data units equal to those fragments based on the data unit which can all be inserted into the queue 16, from the selected data units in the order of the time at which the first frame is received (step 7b). Then, the control section 17A inserts the fragments contained in the first frame into the queue 16. Furthermore, the control section 17A receives and inserts the succeeding fragments into the queue 16 (step 7c).

As described above in detail, in the fourth embodiment, if it is determined that the amount of a received data unit is larger than the amount of free areas in the queue 16, the difference between the amount of the data unit and the amount of free areas in the queue 16 is compared with the predetermined amount. If it is determined that the difference between the amount of the data unit and the amount of free areas in the queue 16 is larger than the predetermined amount, all the fragments of the data unit are discarded.

On the other hand, if it is determined that the difference between the amount of the data unit and the amount of free areas in the queue 16 is equal to or smaller than the predetermined amount, an amount of data units equal to those fragments based on the data unit which can all be inserted into the queue 16 are discarded from a plurality of data units some fragments of which have already been inserted into the queue 16, in which the percentage of the total number of fragments taken up by the number of fragments already inserted into the queue 16 is smaller than the predetermined percentage, in the order of the time at which the first frame is received. Then, the fragments of the received data unit are sequentially inserted into the queue 16.

Thus, according to the fourth embodiment, if the amount of the data unit is compared with the amount of free areas in the queue 16 and is determined to be, for example, slightly larger than it, the utilization efficiency of the queue can be improved by adjusting the amount of free areas in the queue 16 before inserting the fragments of the data unit into the queue 16.

It is also possible to select and discard a data unit that is most unlikely to be defragmented.

In the fourth embodiment, when the amount of free areas in the queue 16 is adjusted, an amount of data units equal to the amount of the received data unit are discarded. However, the amount of data units discarded may have the predetermined amount as described in the third embodiment.

Further, when data units to be discarded are selected, it is also possible to discard those data units which have elapsed a predetermined time, in which the percentage of the total number of fragments taken up by the number of fragments already inserted into the queue 16 is the smallest.

Fifth Embodiment

Figure 8:
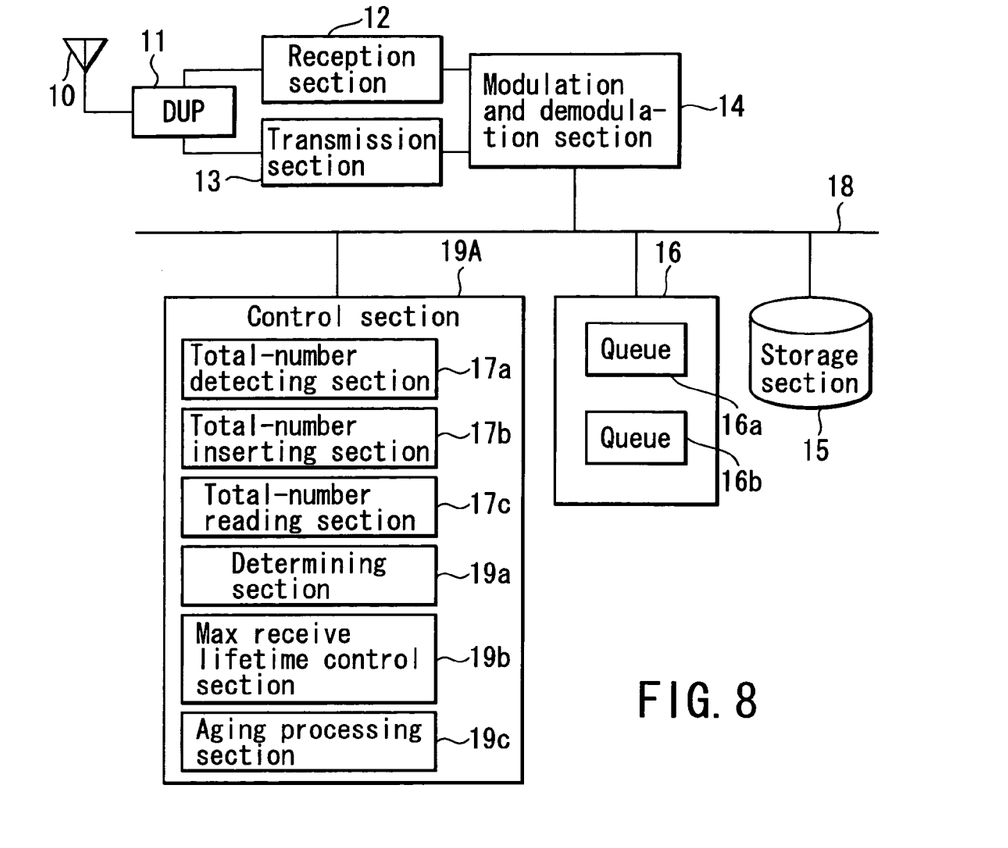
FIG. 8 is a block diagram of the station STA1 according to a fifth embodiment.

FIG. 8 is a block diagram of the STA1 according to a fifth embodiment. In this figure, the STA1 has the same configuration as that in FIG. 2 except for a control section 19A, a determining section 19*a*, and a max receive lifetime control section 19*b*, and an aging processing section 19*c*. Thus, the same arrangements are denoted by the same reference numerals. Their detailed description is omitted.

When the max receive lifetime has elapsed since the reception of the first fragment of a data unit, the aging processing section 19*c* discards the fragments of the data unit inserted into the queue 16. The elapsed time is counted by, for example, a counter (not shown) provided in the STA1.

When the max receive lifetime has elapsed, the determining section 19*a* determines whether or not the percentage of the total number of fragments taken up by the number of fragments already inserted into the queue 16 is equal to or larger than a predetermined percentage or is smaller than this predetermined percentage. The predetermined percentage can be arbitrarily set in accordance with the specification of the apparatus.

If the determining section 19*a* determines that this percentage is equal to or larger than the predetermined percentage, the max receive lifetime control section 19*b* sets the max receive lifetime by increasing it by a predetermined extension time. The predetermined extension time is, for example, the time further required to reconstruct the fragments and serving to improve the utilization efficiency of the queue 16. The predetermined extension time can be arbitrarily set in accordance with the specification of the apparatus.

Figure 9:
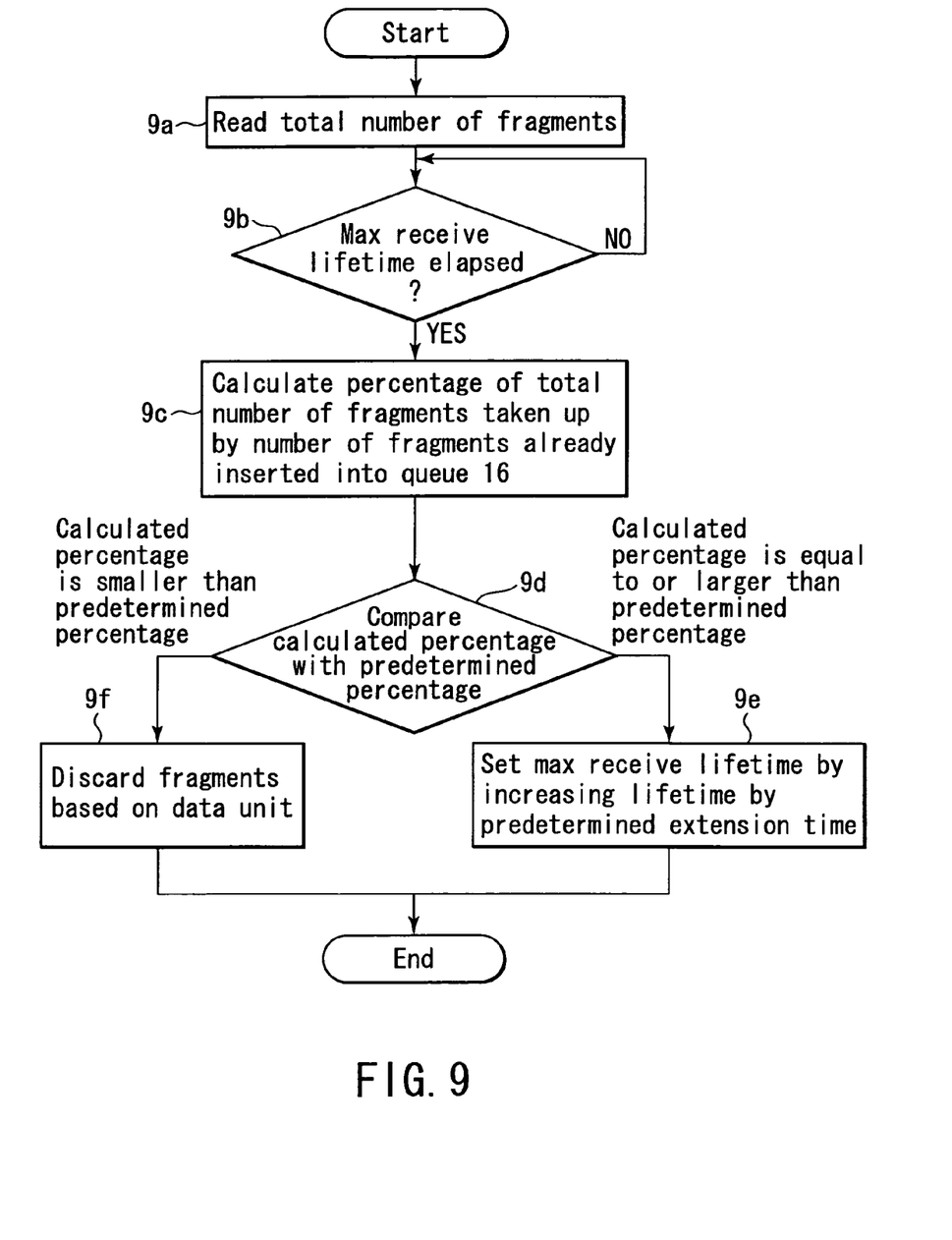
FIG. 9 is a flow chart showing max receive lifetime control executed in the station STA1, shown in FIG. 8.

Now, description will be given of a receiving operation performed by the thus configured STA1. FIG. 9 is a flow chart showing max receive lifetime control.

Figure 10:
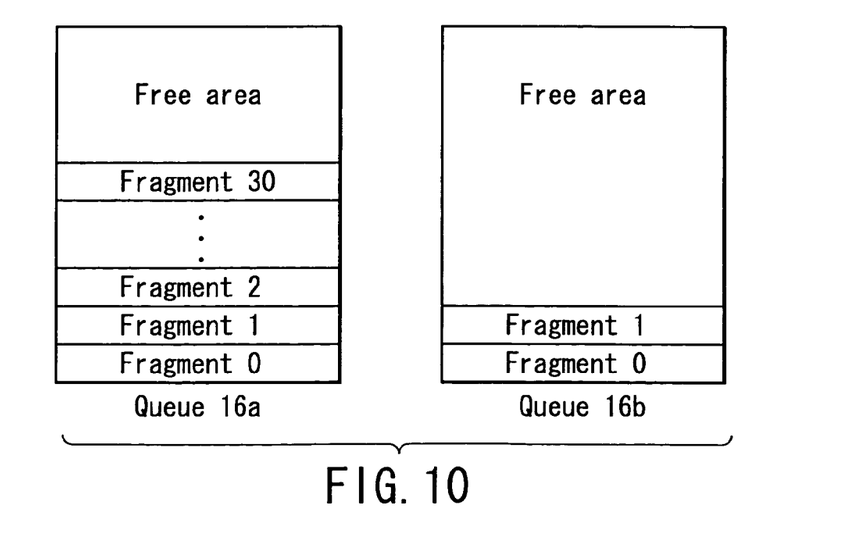
FIG. 10 is a schematic diagram showing that fragments have been inserted into two queues provided in a queue 16.

For example, it is assumed that fragments have been inserted into a plurality of queues and that no succeeding fragments are to be transmitted. In the present example, the queue 16 comprises, for example, two queues (a queue 16*a* and a queue 16*b*). It is assumed that of the fragments based on a first data unit, fragments 0 to 30 have been inserted into the queue 16*a*. It is further assumed that of the fragments based on a second data unit, fragments 0 to 1 are inserted into the queue 16*b*. FIG. 10 is a schematic diagram showing this state.

The control section 19A reads the total number of fragments contained in the header of the received first frame (step 9*a*). Then, the control section 19A carries out detection as to whether or not the max receive lifetime has elapsed (step 9*b*). On detecting the elapse of the max reception lifetime, the control section 19A calculates the percentage of the read total number of fragments taken up by the number of fragments already inserted into the queue 16 (step 9*c*).

Then, the control section 19A compares the calculated percentage with the predetermined percentage (step 9*d*). In step 9*d*, if the control section 19A determines that the calculated percentage is equal to or larger the predetermined percentage, it sets the max receive lifetime by increasing the lifetime by the predetermined extension time (step 9*e*).

On the other hand, in step 9*d*, if the control section 19*d* determines that the calculated percentage is smaller than the predetermined percentage, it discards the fragments based on the data unit (step 9*f*).

As described above in detail, in the fifth embodiment, when the max receive lifetime has elapsed, the percentage of the total number of fragments taken up by the number of fragments already inserted into the queue 16 is calculated. Then, the calculated percentage is compared with the predetermined percentage. Then, if it is determined that the calculated percentage is equal to or larger the predetermined percentage, the max receive lifetime is set by being increased by the predetermined extension time.

Thus, according to the fifth embodiment, an aging process is executed in accordance with the condition in which the fragments are received rather than being executed uniformly.

Further, the utilization efficiency of the queue can be improved by extending the max receive lifetime in accordance with the total number of fragments and the number of fragments already received.

In the fifth embodiment, the total number of fragments is inserted into the first frame containing the first fragment. However, the present invention is not limited to this aspect. For example, the total number of fragments may be inserted into the frames for all the fragments so that when the max receive lifetime has elapsed, the total number of fragments contained in the last frame received can be read and used.

Sixth Embodiment

A sixth embodiment differs from the above fifth embodiment in the determining section 19*a* and the max receive lifetime control section 19b. Accordingly, only the difference will be described, with the description of similar arrangements omitted.

When a predetermined time has elapsed, it is determined whether or not the percentage of the total number of fragments taken up by the number of fragments already inserted into the queue 16 is equal to or larger than a predetermined percentage or is smaller than a predetermined percentage. This predetermined time is shorter than the max receive lifetime and can be arbitrarily set in accordance with the specification of the apparatus.

If the determining section 19a determines that the above percentage is equal to or larger than the predetermined percentage, the max receive lifetime control section 19b sets the max receive lifetime by increasing it by a predetermined extension time. On the other hand, if the determining section 19a determines that the above percentage is smaller than the predetermined percentage, the max receive lifetime control section 19b sets the max receive lifetime by reducing it by a predetermined shortening time. The predetermined extension time is, for example, the time further required to reconstruct the fragments and serving to improve the utilization efficiency of the queue 16. The predetermined extension time can be arbitrarily set in accordance with the specification of the apparatus. The predetermined shortening time can be arbitrarily set in accordance with the specification of the apparatus: its maximum value is equal to the max receive lifetime minus a predetermined time.

Figure 11:
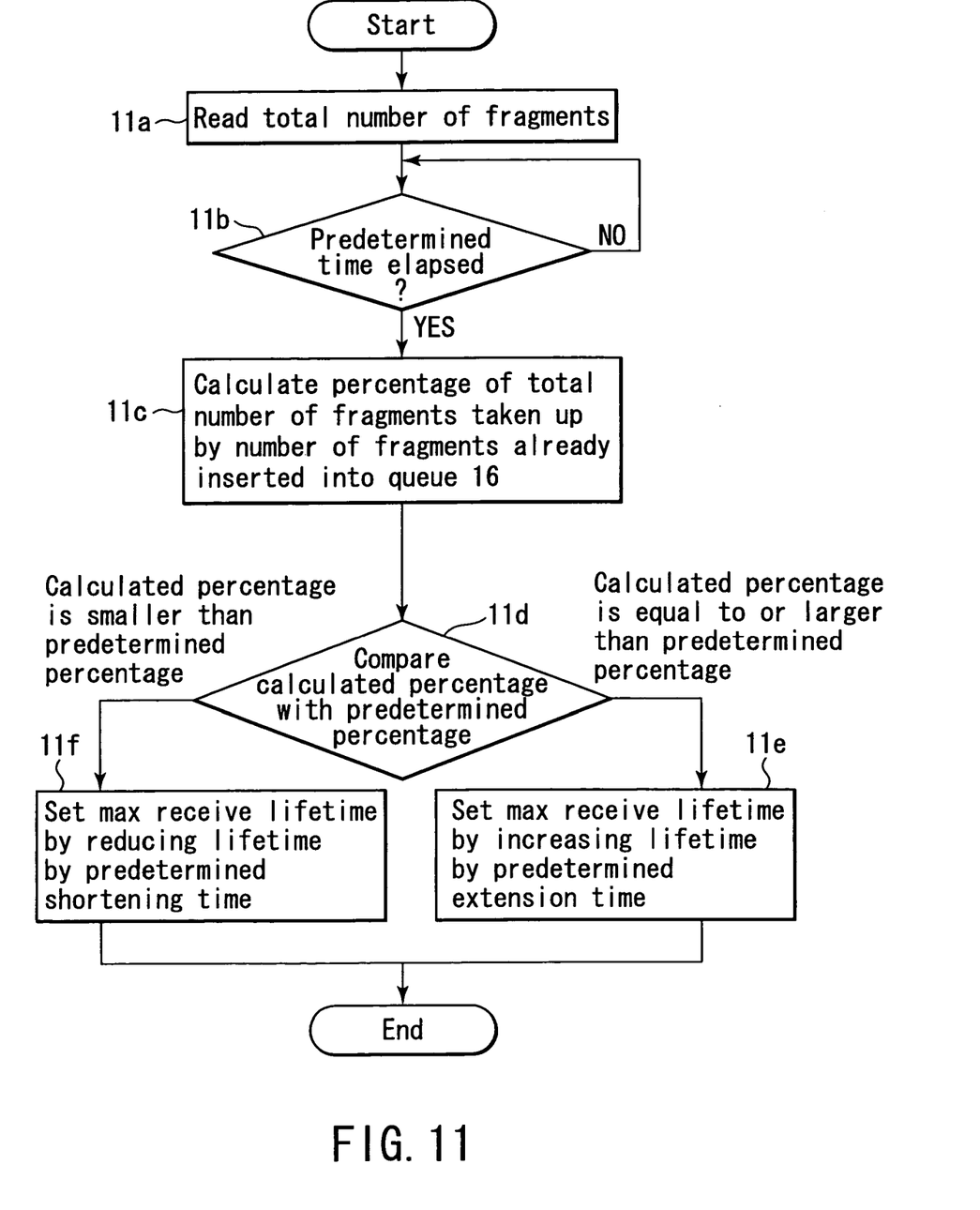
FIG. 11 is a flow chart showing max receive lifetime control executed in the station STA1 according to a sixth embodiment of the present invention.

Now, description will be given of a receiving operation performed by the thus configured STA1. FIG. 11 is a flow chart showing max receive lifetime control.

The control section 19A reads the total number of fragments contained in the header of the received first frame (step 11a). Then, the control section 19A carries out detection as to whether or not the max receive lifetime has elapsed (step 11b). On detecting the elapse of the max reception lifetime, the control section 19A calculates the percentage of the read total number of fragments taken up by the number of fragments already inserted into the queue 16 (step 11c).

Then, the control section 19A compares the calculated percentage with the predetermined percentage (step 11d). In step 11d, if the control section 19A determines that the calculated percentage is equal to or larger the predetermined percentage, it sets the max receive lifetime by increasing the lifetime by the predetermined extension time (step 11e).

On the other hand, in step 11d, if the control section 19d determines that the calculated percentage is smaller than the predetermined percentage, it sets the max receive lifetime by reducing the lifetime by the predetermined shortening time (step 11f).

As described above in detail, in the sixth embodiment, when the predetermined time has elapsed, the percentage of the total number of fragments taken up by the number of fragments already inserted into the queue 16 is calculated. Then, the calculated percentage is compared with the predetermined percentage. Then, if it is determined that the calculated percentage is equal to or larger the predetermined percentage, the max receive lifetime is set by being increased by the predetermined extension time. On the other hand, if it is determined that the calculated percentage is smaller the predetermined percentage, the max receive lifetime is set by being reduced by the predetermined shortening time.

Thus, according to the sixth embodiment, an aging process is executed in accordance with the condition in which the fragments are received rather than being executed uniformly.

Further, the utilization efficiency of the queue can be improved by extending the max receive lifetime in accordance with the total number of fragments and the number of fragments already received.

Furthermore, data units for which fragments have been insufficiently received are discarded before the max receive lifetime expires. This improves the utilization efficiency of the queue.

In the sixth embodiment, the total number of fragments is inserted into the first frame containing the first fragment. However, the present invention is not limited to this aspect. For example, the total number of fragments may be inserted into the frames for all the fragments so that when the max receive lifetime has elapsed, the total number of fragments contained in the last frame received can be read and used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless LAN apparatus comprising:
a reception section which receives frames including fragments respectively, each of the fragments having a predetermined size into which first data is divided;
a reading section which reads the total number of fragments based on the first data, the total number of fragments containing the first frame being based on the first data, the first frame being first received by the reception section;
a queue that stores the received frames for each fragment;
a free-area detecting section which detects free areas in the queue;
a determining section which determines whether the amount of the first data based on the total number of fragments in the first data is larger than the amount of free areas in the queue or is equal to or smaller than the amount of free areas in the queue;
a control section having a function of inserting fragments based on the first data into the queue if the determining section determines that the amount of the first data is equal to or smaller than the amount of free areas in the queue,
wherein if the determining section determines that the amount of the first data is larger than the amount of free areas in the queue, then the determining section determines whether a difference between the amount of the first data and the amount of free areas in the queue is larger than a predetermined amount or is equal to or smaller than the predetermined amount, and
the control section further functions in the following manner: if the determining section determines that the difference between the amount of the first data and the amount of free areas in the queue is equal to or smaller than the predetermined amount, the control section discards fragments of a second data, which is one of the items of data, some fragments of which have already been inserted into the queue, the second data having a smallest percentage of the total number of fragments taken up by the number of fragments already inserted, while inserting the fragments based on the first data into the queue, and if the determining section determines that the difference between the amount of the first data and the amount of free areas in the queue is larger than the predetermined amount, the control section discards the fragments based on the first data.

2. The wireless LAN apparatus according to claim 1, wherein the control section further has a function of discarding the predetermined amount of pieces of data from the items of data in the order of increasing percentage of the total number of fragments taken up by the number of fragments already inserted.

3. The wireless LAN apparatus according to claim 1, wherein the control section further has a function of discarding an amount of pieces of data equal to such fragments based on the first data that can all be inserted into the queue, from the items of data in the order of increasing percentage of the total number of fragments taken up by the number of fragments already inserted.

4. The wireless LAN apparatus according to claim 1, further comprising a total-number detecting section which detects the total number of fragments in third data;
an inserting section which inserts the total number of fragments in the third data into a first frame containing one of a plurality of fragments of the third data which one is to be transmitted first; and
a transmission section which transmits the first frame based on the third data.

5. A wireless LAN apparatus comprising:
a reception section which receives frames including fragments respectively, each of the fragments having a predetermined size into which first data is divided;
a reading section which reads the total number of fragments based on the first data, the total number of fragments containing the first frame being based on the first data, the first frame being first received by the reception section;
a queue that stores the received frames for each fragment;
a free-area detecting section which detects free areas in the queue;
a determining section which determines whether the amount of the first data based on the total number of fragments in the first data is larger than the amount of free areas in the queue or is equal to or smaller than the amount of free areas in the queue;
a control section having a function of inserting fragments based on the first data into the queue if the determining section determines that the amount of the first data is equal to or smaller than the amount of free areas in the queue,
wherein if the determining section determines that the amount of the first data is larger than the amount of free areas in the queue, then the determining section determines whether a difference between the amount of the first data and the amount of free areas in the queue is larger than a predetermined amount or is equal to or smaller than the predetermined amount, and
the control section further functions in the following manner: if the determining section determines that the difference between the amount of the first data and the amount of free areas in the queue is equal to or smaller than the predetermined amount, the control section discards fragments of a second data, which is one of the items of data, some fragments of which have already been inserted into the queue, the second data having a first frame received earliest, while inserting the fragments based on the first data into the queue, and if the determining section determines that the difference between the amount of the first data and the amount of free areas in the queue is larger than the predetermined amount, the control section discards the fragments based on the first data.

6. The wireless LAN apparatus according to claim 5, wherein the control section further has a function of discarding the predetermined amount of pieces of data from the items of data in the order of the time at which the first frame is received.

7. The wireless LAN apparatus according to claim 5, wherein the control section further has a function of discarding an amount of pieces of data equal to such fragments based on the first data that can all be inserted into the queue 16, from the items of data in the order of the time at which the first frame is received.

8. The wireless LAN apparatus according to claim 5, further comprising a total-number detecting section which detects the total number of fragments in third data;
an inserting section which inserts the total number of fragments in the third data into a first frame containing one of a plurality of fragments of the third data which one is to be transmitted first; and
a transmission section which transmits the first frame based on the third data.

9. A wireless LAN apparatus comprising:
a reception section which receives frames including fragments respectively, each of the fragments having a predetermined size into which first data is divided;
a reading section which reads the total number of fragments based on the first data, the total number of fragments containing the first frame being based on the first data, the first frame being first received by the reception section;
a queue that stores the received frames for each fragment;
a free-area detecting section which detects free areas in the queue;
a determining section which determines whether the amount of the first data based on the total number of fragments in the first data is larger than the amount of free areas in the queue or is equal to or smaller than the amount of free areas in the queue;
a control section having a function of inserting fragments based on the first data into the queue if the determining section determines that the amount of the first data is equal to or smaller than the amount of free areas in the queue,
wherein if the determining section determines that the amount of the first data is larger than the amount of free areas in the queue, then the determining section determines whether a difference between the amount of the first data and the amount of free areas in the queue is larger than a predetermined amount or is equal to or smaller than the predetermined amount, and
the control section further functions in the following manner: if the determining section determines that the difference between the amount of the first data and the amount of free areas in the queue is equal to or smaller than the predetermined amount, the control section discards fragments of a second data, which is one of the items of data, some fragments of which have already been inserted into the queue, a percentage of the total number of fragments in the second data taken up by the number of fragments already inserted being smaller than a predetermined percentage, a first frame of the second data being received earliest, while inserting the fragments based on the first data into the queue, and if the determining section determines that the difference between the amount of the first data and the amount of free areas in the queue is larger than the predetermined amount, the control section discards the fragments based on the first data.

10. The wireless LAN apparatus according to claim 9, wherein the control section further has a function of discarding the predetermined amount of pieces of data from the items of data, in which the percentage is smaller than the predetermined percentage, in the order of the time at which the first frame is received.

11. The wireless LAN apparatus according to claim 9, wherein the control section further has a function of discarding an amount of pieces of data equal to such fragments based on the first data that can all be inserted into the queue, from the items of data, in which the percentage is smaller than the predetermined percentage, in the order of the time at which the first frame is received.

12. The wireless LAN apparatus according to claim 9, further comprising a total-number detecting section which detects the total number of fragments in third data;
   an inserting section which inserts the total number of fragments in the third data into a first frame containing one of a plurality of fragments of the third data which one is to be transmitted first; and
   a transmission section which transmits the first frame based on the third data.

13. A wireless LAN apparatus comprising:
   a reception section which receives frames including fragments respectively, each of the fragments having a predetermined size into which first data is divided;
   a reading section which reads the total number of fragments based on the first data, the total number of fragments containing the first frame being based on the first data, the first frame being received first by the reception section;
   a determining section which determines whether the percentage of the total number of fragments in the first data taken up by the number of already received fragments based on the first data to is equal to or larger than a predetermined value or is smaller than the predetermined value;
   a control section which sets a max receive lifetime indicative of an allowable range of time required to receive fragments based on one data by increasing the max receive lifetime by a predetermined extension time if the determining section determines that the percentage is larger than the predetermined value;
   an aging processing section which executes a process of discarding data for which all fragments have not been received when the max receive lifetime has elapsed,
   wherein the determining section carries out determination when a predetermined time has elapsed, the predetermined time being shorter than the max receive lifetime, and
   if the determining section determines that the percentage is equal to or larger than the predetermined value, the control section sets the max receive lifetime by increasing the lifetime by the predetermined extension time, and if the determining section determines that the percentage is smaller than the predetermined value, the control section sets the max receive lifetime by reducing the lifetime by a predetermined shortening time.

14. The wireless LAN apparatus according to claim 13, wherein the determining section carries out determination when the max receive lifetime has elapsed.

15. The wireless LAN apparatus according to claim 13, further comprising a total-number detecting section which detects the total number of fragments in a second data;
   an inserting section which inserts the total number of fragments in the second data into a first frame containing one of a plurality of fragments of the second data which one is to be transmitted first; and
   a transmission section which transmits the first frame based on the second data.

* * * * *